United States Patent Office 3,234,221
Patented Feb. 8, 1966

3,234,221
LOWER ALKENYL, LOWER ALKYNYL AND FLUORO-LOWER ALKYL DERIVATIVES OF 7-AMINO CEPHALOSPORANIC ACID
Eugene E. Galantay and Josef Fried, Princeton, N.J., assignors to Olin Mathieson Chemical Corporation, New York, N.Y., a corporation of Virginia
No Drawing. Filed Oct. 29, 1962, Ser. No. 233,879
6 Claims. (Cl. 260—243)

This invention relates to new derivatives of 7-aminocephalosporanic acid and more particularly to new compounds of the general Formula I:

I 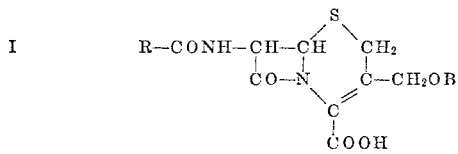

and non-toxic salts thereof; wherein B is hydrogen or acyl and R is aliphatic hydrocarbon or fluorinated aliphatic hydrocarbon. Preferred are those compounds of Formula I wherein B is hydrogen or the acyl radical of a hydrocarbon carboxylic acid of less than twelve carbon atoms, as exemplified by the lower alkanoic acids (e.g., acetic, propionic, butyric, valeric and caproic acid), the lower alkenoic acids (e.g., 2-butenoic acid), the cycloalkanecarboxylic acids, the cycloalkenecarboxylic acids, the monocyclic ar(lower alkanoic acids) (e.g., phenylacetic and β-phenylpropionic acid), and the monocyclic aryl carboxylic acids (e.g., benzoic and p-toluic acid); and R is lower alkyl, as exemplified by methyl, ethyl, propyl, isopropyl, n-butyl, 1,1- dimethylbutyl and n-hexyl; lower alkenyl, as exemplified by allyl, buten-3-yl, penten-1-yl, hexen-3-yl, and hepten-3-yl; lower alkynyl, as exemplified by 4-4-dimethyl-1-pentynyl; and fluoro substituted derivatives of each of these, as exemplified by 4,4-difluoropentyl, 2-fluoro-1-propenyl and 4-fluoro-1- hexynyl. Particularly preferred are those compounds wherein the R radical contains three through seven carbon atoms.

Among the suitable salts may be mentioned the alkali metal salts (e.g., sodium and potassium), the alkaline earth metal salts (e.g., magnesium), and amine salts, such as tertiary amine salts, as exemplified by the tri(lower alkyl)amines (e.g., triethylamine and trimethylamine) and by heterocyclic amines (e.g., N-methylpiperidine and N-methylmorpholine).

The compounds of this invention (the compounds of Formula I and their non-toxic salts) are physiologically active substances which have a high degree of antibacterial activity against a large number of microorganisms, including Gram positive and Gram negative microorganisms such as Staphylococcus aureus, Escherichia coli, Klebsiella pneumoniae, Aerobacter aerogenes and Shigella soneni. Particularly valuable activity was observed against resistant (penicillinase-producing) strains of S. aureus. In addition the compounds of this invention show a particularly pronounced resistance to acids.

The compounds of this invention, wherein B is acetyl, are prepared by interacting 7-aminocephalosporanic acid with a compound of the general Formula II:

II                        RCOZ wherein R is as hereinbefore defined and Z is a halide (preferably chloride), azide, or optimally p-nitrophenoxy. The reaction is preferably conducted in the presence of a base, such as one of the bases listed hereinbefore, optimally in an organic solvent for the reactants. The reaction results in the preparation of compounds of Formula I, wherein B is acetyl, in the form of their salts with the base employed in the reaction.

Compounds II, when new, can be prepared by methods well known in the art from the corresponding acids (Z is hydroxy). Thus, the acid can be treated with thionyl chloride, preferably in the presence of dimethyl formamide, to yield the corresponding acyl chlorides (Z is chlorine), which, if desired, can be converted to the acyl azides (Z is N₃) by treatment with sodium azide. The p-nitrophenyl esters (Z is p-nitrophenoxy) can be prepared by following the procedure of Bodanszky et al. (Biochemical Preparations, vol. 9, p. 110, 1962, John Wiley and Sons, New York city).

Among the suitable reactants can be mentioned the lower alkanoic acids, the lower alkenoic acids, the lower alkynoic acids, and their fluoro substituted derivatives.

The compounds initially formed, of the Formula I, wherein B is acetyl, in the form of their salts, can then be converted to the free acid form in the usual manner, as by treatment with a dilute mineral acid, such as hydrochloric acid, in an aqueous medium and extraction of the free acid into an organic solvent, such as methyl isobutyl ketone, with subsequent evaporation of the solvent. Moreover, these compounds can be converted to the free alcohols (B is hydrogen) by enzymatic hydrolysis of the esters. This enzymatic hydrolysis is preferably carried out using orange peel acetyl esterase [Jeffery et al., Biochem. J., 81, 591 (1961)], and the resulting alcohol can then be esterified with a different acylating agent, preferably an acid anhydride or acyl chloride of a hydrocarbon carboxylic acid of less than twelve carbon atoms, to yield the other esters of this invention.

The following examples illustrate the invention (all temperatures being in centigrade):

EXAMPLE 1

*1,1-dimethylbutyl-cephalosporin, sodium salt (Formula I, R is 1,1-dimethylbutyl; B is acetyl)*

To an ice cold solution of 54 mg. of 7-aminocephalosporanic acid and 0.062 ml. of triethylamine in 3 ml. of methylene dichloride there is added 0.50 ml. of a solution prepared by dissolving 0.666 g. of 2,2-dimethylvaleryl chloride in 10 ml. of methylene dichloride.

After two hours on an ice bath, the reaction mixture is filtered and evaporated to dryness. The residue contains the triethylammonium salt of 1,1-dimethylbutyl-cephalosporin. The triethylammonium salt is converted to the free acid by dissolving in water, acidifying to pH 2.2 by treatment with 5 N hydrochloric acid and extraction with methyl isobutyl ketone. Upon evaporation of the ketone, the free acid is obtained. The sodium salt is formed by treating the methyl isobutyl ketone extract with a methyl isobutyl ketone solution of sodium ethylhexoate, whereupon the pure sodium salt crystallizes.

EXAMPLE 2

*3-hepten-3-yl-cephalosporin, triethylammonium salt (Formula I, R is 3-hepten-3-yl; B is acetyl)*

Following the first steps of Example 1 but substituting an equivalent amount of 2-ethyl-2-hexenoic acid chloride for the dimethylvaleryl chloride, 3-hepten-3-yl-cephalosporin, triethylammonium salt is obtained.

EXAMPLE 3

*4,4-dimethyl-l-pentynyl-cephalosporin, triethylammonium salt (Formula I, R is 4,4-dimethyl-pentynyl; B is acetyl)*

5,5-dimethyl-2-hexynoic acid is converted to its p-nitrophenyl ester by the method of Bodanzsky et al., supra.

300 mg. of the crystalline p-nitrophenyl ester is added to a solution prepared from 274 mg. of 7-aminocephalosporanic acid and 0.30 ml. of triethylamine in 3 ml. of dimethyl formamide. After 36 hours at room temperature, 15 ml. of dry ether is added to obtain about 246 mg. of the crystalline triethylammonium 4,4-dimethyl-1-pentynyl-cephalosporin.

EXAMPLE 4

*4,4-difluoropentyl-cephalosporin, N-ethylpiperidine salt (Formula I, R is 4,4-difluoropentyl; B is acetyl)*

To a solution of 54 mg. of 7-aminocephalosporanic acid and 30 mg. of N-ethylpiperidine in 3 ml. of dimethyl formamide there is added a solution of 5,5-difluorocaproyl azide (prepared in situ from 34 mg. of 5,5-difluorocaproyl chloride and 9 mg. of lithium azide in 2 ml. of dimethyl formamide). After 15 hours at 10°, the mixture is concentrated in high vacuum to about 2 ml. and then treated with 15 ml. of dry ether, whereupon about 60 mg. of the N-ethylpiperidine salt of 4,4-difluoropentyl-cephalosporin crystallizes.

EXAMPLE 5

*2 - fluoro - 1 - propenyl-cephalosporin, triethylammonium salt (Formula I, R is 2-fluoro-1-propenyl; B is acetyl)*

Following the procedure of Example 3, but substituting an equivalent amount of 3-fluorocrotonic acid for the dimethyl-hexynoic acid, 2-fluoro-1-propenyl-cephalosporin, triethylammonium salt is obtained.

EXAMPLE 6

*4,4-difluoropentyl-desacetyl-cephalosporin, potassium salt (Formula I, R is 1,1-dimethylbutyl; B is hydrogen)*

To a solution of 200 mg. of 1,1-dimethylbutyl-cephalosporin, sodium salt, in 0.50 ml. of water, kept at 30°, there is added 1.0 ml. of orange peel (citrus) acetyl esterase solution [Jeffrey et al., Biochem. J., 81, 591 (1961)] and the pH is maintained at 6.6 by automatic addition of N/10 sodium hydroxide solution. After an uptake of 0.95 equivalent of sodium hydroxide, the mixture is freeze-dried to yield the crude 1,3-dimethylbutyl-desacetyl-cephalosporin, sodium salt, which is further purified by ion exchange chromatography.

EXAMPLE 7

*4,4-difluoropentyl-desacetyl-cephalosporin, potassium salt (Formula I, R is 4,4-difluoropentyl; B is hydrogen)*

A solution of 50 mg. of 4,4-difluoropentyl-cephalosporin, N-ethylpiperidine salt in 5 ml. of water is acidified to pH 2.2 with 5 N hydrochloric acid and extracted with methyl isobutyl ketone. From the organic solvent, the cephalosporin is reextracted into water by adding enough N/10 potassium hydroxide solution to obtain a pH value of 6.6 in equilibrium. To the separated aqueous phase kept at 30° there is added 0.25 ml. of orange peel (citrus) acetyl esterase solution and the pH is maintained at 6.6 by further automatic addition of N/10 potassium hydroxide solution. After an uptake of a total of 1.8 equivalents of potassium hydroxide, the mixture is worked up as described in Example 6 to yield 4,4-difluoropentyl-desacetyl-cephalosporin, potassium salt.

EXAMPLE 8

*1,1-dimethylbutyl-desacetyl-phenylacetyl - cephalosporin, sodium salt (Formula I, R is 1,1-dimethylbutyl; B is phenylacetyl)*

To a suspension of 1.00 g. of 1,1-dimethylbutyl-desacetyl-cephalosporin, sodium salt (Example 6), in 5 ml. of anhydrous dimethyl formamide, there is added 0.40 g. of phenylacetyl chloride and the mixture is stirred for eight hours at room temperature. The mixture is then evaporated in high vacuum and the residue, after being extracted several times with dry ether, is dissolved in a pH 5.0 pyridine-acetate buffer. The solution is added to an Amberlite XE–58 column (120–200 mesh, acetate form) and elution is carried out with the same buffer. A lactonic by-product is first eluted, which is followed by the fractions containing the 4,4-difluoropentyl-desacetyl-phenylacetyl cephalosporin. The residue obtained from freeze-drying of these fractions is redissolved in water. Acidification to pH 2.2, extraction with methyl isobutyl ketone and treatment of the dried organic layer with a sodium ethyl-hexoate solution in the same solvent yields the crystalline sodium salt of 1,1-dimethylbutyl, desacetyl-phenyl-acetyl-cephalosporin.

This invention may be variously otherwise embodied within the scope of the appended claims.

What is claimed is:

1. A compound selected from the group consisting of acids of the formula $$R-CONH-CH-CH\diagup\!\!\!\!\!\diagdown\!\!\!S\!\!\!\diagdown\!\!\!CH_2$$
$$|\quad\quad\quad|\quad\quad\quad|$$
$$CO-N\quad\quad C-CH_2OB$$
$$\diagdown\!\!\!C\!\!\!\diagup$$
$$|$$
$$COOH$$

and non toxic basic salts thereof, wherein B is selected from the group consisting of hydrogen and the acyl radical of a hydrocarbon carboxylic acid of less than 12 carbon atoms, and R is selected from the group consisting of fluoro-lower alkenyl, lower alkynyl and 4,4-di fluoropentyl.

2. A non toxic basic salt of an acid according to claim 1 wherein R is fluoro-lower alkenyl and B is acetyl.

3. A non toxic basic salt of an acid according to claim 1 wherein R is 2-fluoro-1-propenyl and B is acetyl.

4. A non-toxic basic salt of an acid of the formula $$(\text{Lower alkynyl})-CONH-CH-CH\diagup\!\!\!S\!\!\!\diagdown CH_2\quad O$$
$$|\quad\quad\quad|\quad\quad\quad\quad\quad\parallel$$
$$CO-N\quad\quad C-CH_2OC-CH_3$$
$$\diagdown\!\!\!C\!\!\!\diagup$$
$$|$$
$$COOH$$

5. A non-toxic basic salt of an acid of the formula $$CH_3$$
$$|$$
$$CH_3-C-CH_2-C\equiv C-CONH-CH-CH\diagup\!\!\!S\!\!\!\diagdown CH_2\quad O$$
$$|\quad\quad\quad\quad\quad\quad\quad|\quad\quad\quad\quad\quad\parallel$$
$$CH_3\quad\quad\quad\quad\quad\quad CO-N\quad\quad C-CH_2OC-CH_3$$
$$\diagdown\!\!\!C\!\!\!\diagup$$
$$|$$
$$COOH$$

6. A non-toxic basic salt of an acid of the formula $$F$$
$$|$$
$$CH_3-C-CH_2-CH_2-CH_2-CONH-CH-CH\diagup\!\!\!S\!\!\!\diagdown CH_2\quad O$$
$$|\quad\quad\quad\quad\quad\quad\quad\quad\quad\quad|\quad\quad\quad\quad\quad\parallel$$
$$F\quad\quad\quad\quad\quad\quad\quad\quad CO-N\quad\quad C-CH_2OC-CH_3$$
$$\diagdown\!\!\!C\!\!\!\diagup$$
$$|$$
$$COOH$$

References Cited by the Examiner

UNITED STATES PATENTS 2,941,995  6/1960  Doyle et al. _____ 260—239.1
3,173,916  3/1965  Shull et al. _____ 260—243

OTHER REFERENCES

Abraham et al.: Endeavour, vol. XX, No. 78, pages 92–100, pages 97–98 relied on, April 1961.

Journal American Medical Association, page 466, May 24, 1958.

Loder et al.: Biochemical Journal, vol. 79, pages 408–416, pages 409–410, 413–414 relied on, 1961.

Morton: The Chemistry of Heterocyclic Compounds, page VI of the preface (1946).

HENRY R. JILES, *Acting Primary Examiner.*

J. W. ADAMS, *Assistant Examiner.*